(12) United States Patent
Bonicatto (10) Patent No.: US 9,369,180 B1
(45) Date of Patent: Jun. 14, 2016

(54) SIGNAL FEEDBACK CIRCUIT IN POWER-LINE-COMMUNICATION SYSTEMS

(71) Applicant: Landis+Gyr Technologies, LLC, Pequot Lakes, MN (US)

(72) Inventor: Damian Bonicatto, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 418 days.

(21) Appl. No.: 14/038,303

(22) Filed: Sep. 26, 2013

(51) Int. Cl.
*H04B 3/54* (2006.01)
*H04B 1/00* (2006.01)

(52) U.S. Cl.
CPC .................................. *H04B 3/542* (2013.01)

(58) Field of Classification Search
CPC ......................................................... H04B 1/00
USPC ................................................................ 307/3
See application file for complete search history.

(56) References Cited

U.S. PATENT DOCUMENTS

| | | |
|---|---|---|
| 5,467,011 A | 11/1995 | Hunt |
| 5,581,229 A | 12/1996 | Hunt |
| 6,998,963 B2 | 2/2006 | Flen et al. |
| 7,102,490 B2 | 9/2006 | Flen et al. |
| 7,145,438 B2 | 12/2006 | Flen et al. |
| 7,180,412 B2 | 2/2007 | Bonicatto et al. |
| 7,224,740 B2 | 5/2007 | Hunt |
| 7,236,765 B2 | 6/2007 | Bonicatto et al. |
| 7,432,824 B2 | 10/2008 | Flen et al. |
| 7,742,393 B2 | 6/2010 | Bonicatto et al. |
| 7,791,468 B2 | 9/2010 | Bonicatto et al. |
| 8,238,263 B2 | 8/2012 | Kohout et al. |
| 8,325,728 B2 | 12/2012 | Zeppetelle et al. |
| 8,428,201 B1 | 4/2013 | McHann, Jr. et al. |
| 8,619,846 B2 | 12/2013 | Johnson et al. |
| 2004/0227621 A1* | 11/2004 | Cope ..................... G02B 6/483 370/487 |

OTHER PUBLICATIONS

J. Vigneron and K. Razazian. "G3-PLC Powerline Communication Standard for Today's Smart Grid." G3-PLC Alliance, Oct. 2012. www.g3-plc.com/content/presentations.

* cited by examiner

*Primary Examiner* — Robert Deberadinis
(74) *Attorney, Agent, or Firm* — Crawford Maunu PLLC (57) ABSTRACT

An apparatus is provided for data communication over power lines in a PLC system. The apparatus includes a data-coupling circuit configured to provide data to the power lines for transmission. The data-coupling circuit includes a DC-isolation circuit configured to isolate circuitry of the data-coupling circuit from the power lines. The apparatus also includes a feedback circuit connected to the DC-isolation circuit. The feedback circuit has a power-tap circuit on an endpoint side of the feedback circuit. The power-tap circuit is configured to provide a feedback signal indicative of an estimate of an amount of power, current, and/or voltage provided from the data-coupling circuit through the DC-isolation circuit and to the power lines. Based on the feedback the signal, the strength of a transmitted may be adjusted (e.g., to maintain constant signal strength).

20 Claims, 4 Drawing Sheets

SIGNAL FEEDBACK CIRCUIT IN POWER-LINE-COMMUNICATION SYSTEMS

BACKGROUND

Digital communication over noisy channels (e.g., over power lines and wireless mediums) poses a challenge to reliable, error-free data transfer between a transmitter and receiver. Portions of the transmitted data may be corrupted by noise, resulting in errors at a receiver. Noise and errors can be caused by a variety of system and/or environmental issues, especially for relatively high data-throughput implementations over power-line communication (PLC) networks.

SUMMARY

Various aspects of the present disclosure are related to network applications for data communication in a PLC network. Some embodiments provide for data communication in a PLC network having a plurality of endpoints (e.g., power meters) configured to communicate data to a data processing apparatus (e.g., collector or central command station) over a set of power lines. In some embodiments, an apparatus is provided for data communication over power lines in a PLC system between a collector circuit and endpoint circuits that measure and/or control power consumption at remotely-located facilities. The apparatus includes a data-coupling circuit, as used with or as part of each local or near-end circuit (e.g., with the endpoint and/or the collector circuit), configured to provide a data signal to the power lines for transmission to and/or from the remote or far-end circuit (e.g., with the collector circuit and/or the endpoint). The apparatus also includes a feedback circuit connected to a DC-isolation circuit, which is configured to isolate the local circuitry from the power lines. The feedback circuit has a power-tap circuit on the local (isolated circuitry) side of the feedback circuit. The power-tap circuit is configured to provide a feedback signal indicative of an estimated amount of power, current, and/or voltage provided from the data-coupling circuit, through the DC-isolation circuit, to the power lines. Based on the feedback signal, the strength transmitted may be adjusted (e.g., to maintain constant signal strength).

In some embodiments, a PLC system is provided that includes a PLC collector circuit and one or more endpoint circuits. The endpoint circuits are configured to communicate with the PLC collector circuit over a set of power lines using a plurality of data channels. For each of the endpoint circuits, a respective signal-processing apparatus is either communicatively connected to or forms part of the endpoint circuit. The signal-processing apparatus includes a data-coupling circuit configured to provide a data signal from the corresponding endpoint circuit to the power lines for transmission to the PLC collector circuit. The data-coupling circuit includes a DC-isolation circuit configured to isolate an endpoint side of the data-coupling circuit from the power lines on a collector circuit side of the data-coupling circuit. The signal-processing apparatus also includes a feedback circuit connected to the DC-isolation circuit. On an endpoint side, the feedback circuit includes a power-tap circuit configured to characterize or estimate a power parameter applied to the power lines. The feedback circuit includes current-feedback and/or voltage-feedback circuits configured to provide a feedback signal that indicates an amount of current and/or voltage being coupled from the data-coupling circuit, through the DC-isolation circuit, to the power lines.

Some embodiments include a method for communicating data over power lines between a PLC collector circuit and its power-line-coupled endpoint circuits in a PLC system. A data-coupling circuit is provided. The data-coupling circuit is configured to provide a data signal from an endpoint side thereof to the power lines. The data-coupling circuit is also configured to isolate data-coupling circuitry on an endpoint side thereof from the power lines on a collector circuit side thereof. The data-coupling circuit includes a feedback circuit having a current-feedback circuit and/or a voltage-feedback circuit configured for tapping or shunting power. Using the feedback circuit, an amount of current, voltage, and/or power provided from the data-coupling circuit to the power lines is estimated. In some implementations, an amplification setting of the data signal, provided to the power lines by the data-coupling circuit, is adjusted in response to and based on an assessment of the estimation.

As more generally applicable to some other applications, in some embodiments an apparatus is configured to transmit data between two circuits over various transmission lines, which may be susceptible to changes in impedance. The apparatus includes a data-coupling circuit configured to communicatively couple a first circuit data to the power lines for transmission to a second circuit. The data-coupling circuit includes a DC-isolation circuit configured to isolate the first circuit from the transmission lines. The apparatus also includes a feedback circuit connected to the DC-isolation circuit. The feedback circuit has a power-tap circuit configured to provide a feedback signal indicative of an estimate of power, current, and/or voltage applied to the transmission lines by the data-coupling circuit. Based on the feedback signal, strength of a transmitted signal may be adjusted.

These and other aspects of the present disclosure are exemplified in a number of implementations and applications, some of which are described in the accompanying drawings and the description below. Other features, aspects, and advantages of the subject matter will become apparent from the description, the drawings, and the claims.

BRIEF DESCRIPTION OF THE DRAWINGS

The disclosure may be more completely understood in consideration of the following detailed description of various embodiments of the disclosure in connection with the accompanying drawings, in which.

While various embodiments are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Some various aspects of the present disclosure are directed toward systems and methods for communicating data over networks susceptible to changes in channel conditions that may affect signal strength and lead to errors or need for possible adjustment in the manner that data is communicated between circuit nodes of a PLC system. As exemplified in the ensuing discussion of PLC networks operating in a PLC system, embodiments of the present disclosure describe endpoint circuits (as one such circuit node) that are configured to communicate data (e.g., power usage and/or status reports) to a collector circuit (as another circuit node) over a set of power lines. In such PLC networks, the collector circuit(s) are located remote from the facility at which the endpoint circuits are used or installed. The endpoint circuits (a.k.a., endpoints) are installed at a multitude of facilities to which the PLC system provides power from a power utility company. For exemplary applications, such endpoints are implemented in the form of meters, load control switches/devices, remote service switches, and other endpoints that access (send and/or receive data) carried on the power lines. As a more specific example, such endpoints can be configured to provide updated information (e.g., power consumption information and/or endpoint operating status information) by transmitting data over power lines on certain (sub)channels (and times) for designated communication with collector circuit, so that the collector circuit can cooperatively communicate information over the same power lines. For some PLC systems consistent with embodiments of the present disclosure, the communications on the different so-called channels are characterized as a single (PLC) channel that is shared by way of timeslots, or subchannels, respectively assigned for individual endpoints.

For many PLC applications involving high-data throughput communication, more complex/difficult schemes are used. This follows because unlike many wireless communication systems, the communication medium involves use of a common set of (power) hard-wired lines and over which many or a multitude (many thousands) of remotely-located devices convey data on a regular (per diem) basis. In order to achieve such high-data throughput, attention must be given to a variety of issues that can give rise to even more subtle, potential causes of such error.

In some embodiments, an apparatus is provided for communicating data between an endpoint circuit and a collector circuit in a PLC system. As implemented in or as part of either or both types of circuit nodes, the apparatus monitors one or more characteristics of a data transmission (e.g., voltage, current, and/or power parameter(s)) so that the signal may be adjusted in response to adverse conditions that might cause or lead to errors in the communication. In connection with the present disclosure, it has been recognized that such conditions (causing or leading to communication errors) track with undesirable changes in signal strength between the collector nodes and the many remotely-located endpoints. Such changes can ensue from any of a variety of system/environmental conditions including, for example, related changes in impedance as seen by the endpoints where they couple to the power lines. Addressing this and various other adverse conditions, aspects of the present disclosure are directed to an apparatus that assists with the coupling of data to the power lines for transmission to the collector circuit.

According to one embodiment, the data-coupling circuit includes a DC-isolation circuit for interfacing directly to the power lines while isolating endpoint circuitry on an endpoint side of the data-coupling circuit relative to the collector-circuit side of the circuit. In one exemplary implementation, the DC-isolation circuit is or includes a power transformer having a primary side, corresponding to the endpoint side of the data-coupling circuit, and a secondary side corresponding to the collector-circuit side of the data-coupling circuit.

A feedback circuit is connected to the DC-isolation circuit and is configured to provide a feedback signal indicative of an estimate of one or more characteristics of the data signal provided from the data-coupling circuit through the DC-isolation circuit and to the power lines. In some implementations, the feedback circuit includes a power-tap circuit configured to sample the one or more characteristics of the data signal. In one implementation, the power-tap circuit includes a shunt-resistive circuit from which a voltage signal is obtained and then used to measure current applied to the power lines.

The feedback signal may indicate a number of different characteristics of a signal transmission including, e.g., power, current, and/or voltage provided to the power lines by the data-coupling circuit. In some implementations, the feedback signal includes several signal components indicating different characteristics of the signal transmission. For example, in one implementation, the feedback signal includes a first signal component indicating an amount of current provided to the power lines by the data-coupling circuit and a second signal component indicating an amount of voltage provided to the power lines by the data-coupling circuit. In some embodiments, the feedback circuit includes one or more signal-processing circuitries such as filters and capacitors configured to condition the feedback signal. For instance, one implementation of the feedback signal is conditioned using a low-pass filter. In another implementation, the feedback signal is conditioned using an anti-aliasing filter. In some implementations, the feedback circuit may convert the feedback signal from an analog to a digital signal for evaluation.

Based on the feedback signal, signal strength of a transmitted data signal may be adjusted (e.g., to maintain a constant signal strength). For instance, in some embodiments, the apparatus includes a signal processing circuit configured to assess the feedback signal and, via a signal-adjustment circuit, adjust the signal strength of a data signal for presentation to the power lines. In some implementations, the processing circuit is further configured to indicate, in response to the assessment, whether a constant voltage is being applied to by the data-coupling circuit to the power lines. In one implementation, the signal processing circuit adjusts the signal strength of the data signal provided from the logic circuit to the data-coupling circuit. In another implementation, the adjustment circuit is configured to adjust a signal strength of the data signal provided to the power lines by adjusting a gain setting of the variable-gain circuit of the data-coupling circuit. The signal processing circuit for adjusting the signal strength may be included in a logic circuit of the endpoint (or collector circuit) or may be included in a separate control circuit connected to the logic circuit and data coupling circuit.

The PLC apparatus may be used to facilitate communication over power lines for a number of different devices in a PLC system and may be connected in a number of configurations. In some embodiments, the PLC apparatus is included as part of an endpoint circuit and/or collector circuit which is communicatively coupled with the endpoint via the PLC power lines. In some other embodiments, the PLC apparatus is a circuit external to the endpoint (or collector circuit) and connected as an interface between the endpoint circuit (or collector circuit) and the power lines. In some embodiments, the PLC apparatus is included as an interface to or as an integral part of a collector circuit for specially-designated (higher-priority) situations. In some embodiments, a system is provided that includes a plurality of endpoints and a collector connected to communicate with each other over power lines as described above.

In different embodiments and applications, endpoint and collector circuits may communicate various different types of data. For instance, in some embodiments, an endpoint may be a power meter configured to monitor power usage at a remote location (e.g., a residential or commercial customer) and provide power usage reports to the collector circuit. In some embodiments, an endpoint may be configured to monitor power generation at a remote location (e.g., wind turbine, solar collector, or other power generation) and provide reports to the collector indicating an amount of power generated and/or provided to the power lines. In some embodiments, an endpoint may provide status reports indicating operating status of the endpoint and/or power distribution network.

Various embodiments encode data for transmission over power lines using various different modulation schemes, which may modulate, e.g., frequency, amplitude, and/or phase of a signal to encode a data value. In some embodiments, the modulation scheme used for transmission may provide features including, e.g., forward-error-correction, quality of service (QOS), and/or load-balancing. As examples, a PLC system may use modulation schemes specified by a PLC standard including, e.g., the Powerline Related Intelligent Metering Evolution (PRIME) standard, the G3-PLC standard adopted by the International Telecommunications Union (ITU), and/or IEEE P1901.2. For further information on G3-PLC compliant implementations (as identifiable via the G3-PLC standard including revisions thereto), reference may be made to the standards document known as ITU-G9955 (see, e.g., www.ITU.INT/Rec/T-Rec-G.9955), which is fully incorporated by reference herein. Such publications also discuss exemplary/recommended modulation schemes, such as Orthogonal Frequency Division Multiple Access (OFDM or OFDMA).

Figure 1:
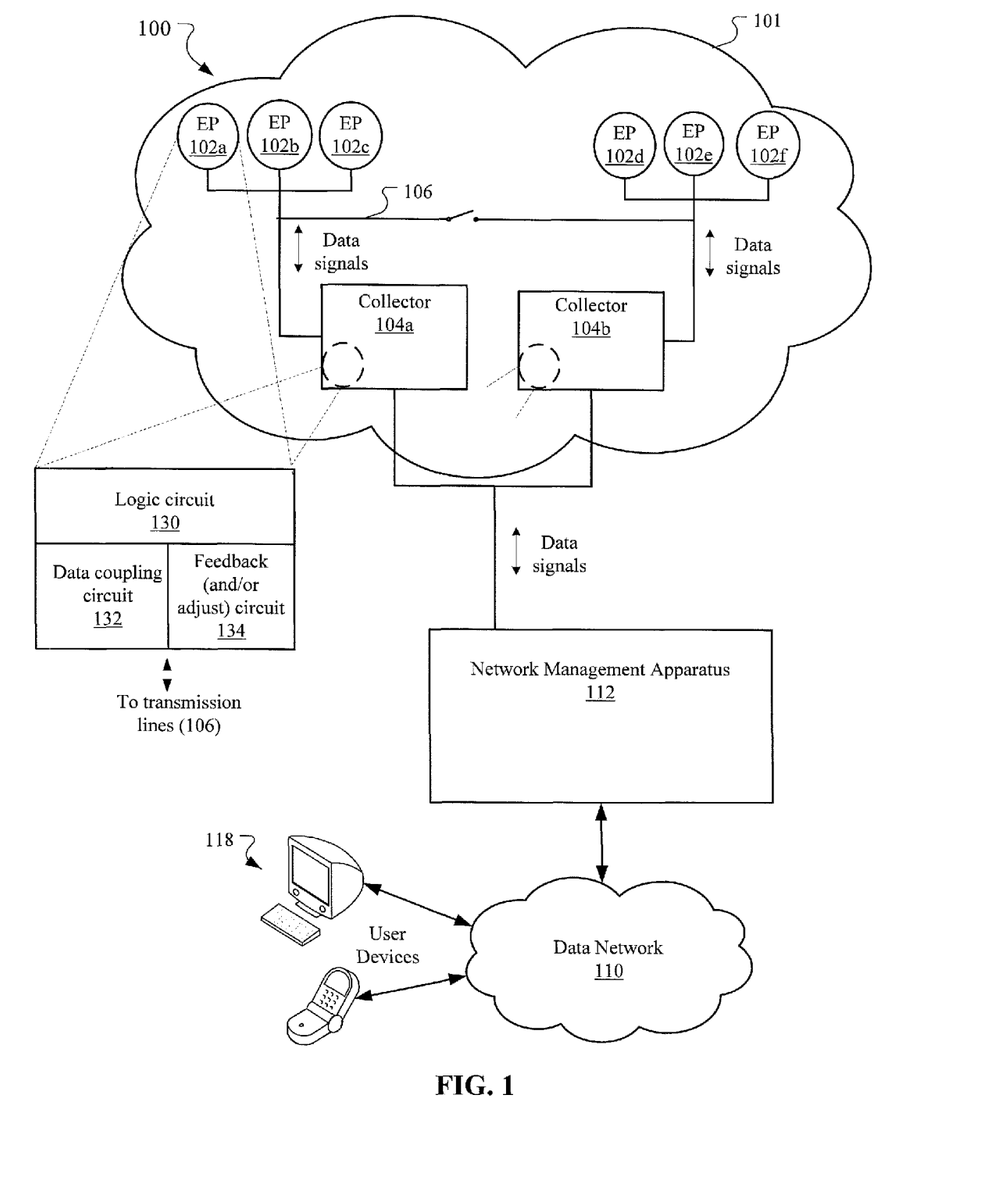
FIG. 1 shows a block diagram of an example network environment in which endpoints transmit data.

Turning now to the figures, FIG. 1 shows a block diagram of an example network environment 100 in which endpoints 102 transmit data in accordance with one or more embodiments of the present disclosure. The network environment 100 includes a service network 101 in which a plurality of endpoints 102a-102f are coupled (e.g., communicatively coupled) to collector circuits 104a, 104b by transmission lines 106 (e.g., power lines).

As exemplified by endpoint 102a in FIG. 1, each endpoint includes circuitry 130, 132 and 134 that performs endpoint functions and generates data signals to be transmitted to a corresponding collector 104a, 104b. While the endpoint and/or each collector might be implemented to take advantage of such circuitry, FIG. 1 exemplifies this circuitry as being on the endpoint side and as part of the endpoint. This circuitry includes a logic circuit 130 and a data-coupling circuit 132 configured to provide data signals from the logic circuit 130 to the transmission lines 106. The data-coupling circuit 132 also provides DC-isolation between the transmission lines and the logic circuit. The endpoint also includes a feedback circuit 134 connected and configured to provide a feedback signal indicating an amount of voltage, current, and/or power provided from the data-coupling circuit to the transmission lines 106. Based on the feedback signal, the endpoint can adjust the amplitude (signal strength) of a data-conveying signal, e.g., to maintain constant signal strength and/or to compensate for existing or anticipated adverse conditions.

In certain special situations, this adjustment can be made in an abundance of caution for a prioritized communication that treats certain types of data or data-transmission times as more important that other data types or data-transmission times. As examples, such data types might be data that is being resent due to previously-reported errors and/or for data that is being sent at selected sensitive-data data-transmission times (e.g., audited data and/or monthly billing data).

In specific implementations, the endpoint provides this adjustment in different ways. As one category, the endpoint provides this adjustment automatically based on threshold criteria (e.g., threshold levels of the endpoint feedback signal, pre-programmed times, and/or responses to certain data requests from the collector node) as programmed in the endpoint. In another category, the endpoint provides this adjustment based only on criteria specified and provided by the collector node (e.g., where the collector node assesses the need for such adjustment and then directs the endpoints to monitor and adjust the threshold levels of the endpoint feedback signal, pre-programmed times, and/or responses to certain data requests from the collector node) as programmed in the endpoint. In yet another category, the endpoint provides this adjustment based on both of the above categories with adjustment being provided adaptively and based on communication with collector node. The adjustments may ensue from criteria specified and provided by the collector node and also criteria specified as programmed in the endpoint.

Collectors 104a, 104b provide communications received from the endpoints 102a-102f to a data processing apparatus 112 (e.g., a network management apparatus). The data processing apparatus (e.g. 112) is configured to process communications that are received from collectors 104a, 104b and/or control aspects of the service network, which is based, at least in part, on the communications provided by the collectors 104a, 104b.

The endpoints 102 can be any device capable of transmitting data in the network environment 100. For example, the endpoints 102 can be, e.g., meters in a utility network (e.g., electricity meters, gas/water meters, or load (on-off-schedule) control devices), computing devices, television set top terminals, or telephones that transmit data in the service network 101. The endpoints 102 can be implemented to monitor and report various operating characteristics of the service network 101. For example, in a power distribution network, power lines may be used for PLC. Meters can monitor characteristics related to power usage in the network. Example characteristics related to power usage in the network include average or total power consumption, power surges, power drops, and load changes, among other characteristics. The endpoints 102 report the operating characteristics of the service network 101 over respective communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be implemented in power line communication networks that dynamically allocate available bandwidth according to an OFDM spectrum allocation technique or another channel allocation technique (e.g., Time Division Multiple Access, Code Division Multiple Access, and other Frequency Division Multiple Access techniques).

In some embodiments, the endpoints 102 are power meters in a power distribution network and transmit reporting data to the data processing apparatus 112. The reporting data may include, e.g., measures of total power consumption, power consumption over a specified period of time, peak power consumption, instantaneous voltage, peak voltage, minimum voltage and other measures of related to power consumption and power management (e.g., load information). In some implementations, each of the power meters can also transmit status data that specify a status of the power meter (e.g., operating in a normal operating mode, emergency power mode, or another state such as a recovery state following a power outage).

In FIG. 1, endpoints 102a-102c and 102d-102f transmit data over communications channels to collectors 104a, 104b, respectively. A collector is a data processing apparatus that receives communications from endpoints to manage the service network 101 or to forward the communications to a network management apparatus 112 and/or through a data network 110. For example, a collector (e.g., 104a) can include a receiver that receives data signals from endpoints (e.g., 102a-102c) and logs data from the data signals. A collector can also take action based on the data received from the endpoints and transmit the data to a network management apparatus 112 that manages the service network 101. Collectors 104a, 104b can transmit the data as individual symbols (one or more bits of data) or generate a consolidated packet that includes data from multiple symbols received from the endpoints 102a-102f.

In some implementations, a single collector (e.g., 104a) can be configured to receive data from many thousands of endpoints and transmit the data to a network management apparatus 112. The network management apparatus 112 is a data processing apparatus that processes communications that are received from collectors 104a, 104b and/or controls aspects of the service network based, at least in part, on the data received from the collectors 104a, 104b.

In some embodiments, the network management apparatus 112 in a PLC network can receive data indicating that power usage is significantly higher in a particular portion of a power network than in other portions of the power network. Based on this data, the network management apparatus 112 can allocate additional resources to that particular portion of the network, e.g., to load balance, or provide data specifying that there is increased power usage in the particular portion of the power network.

In some implementations, the network management apparatus 112 provides data to user devices 118 that can be accessed, e.g., by the network operator, maintenance personnel and/or customers. For example, data identifying increased power usage can be provided to a user device 118 accessible by the network operator, who can, in turn, determine an appropriate action regarding the increased usage. Additionally, data identifying a time-of-use measure and/or a peak demand measure can also be provided to the user devices 118. Similarly, if there has been a power outage, the network management apparatus 112 can provide data to user devices 118 that are accessible by customers to provide information regarding the existence of the outage and potentially provide information estimating duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only two collectors 104a, 104b and one network management apparatus 112 are shown, the service network 101 can include many different collectors that can each communicate with thousands of endpoints and many different data processing apparatus that can each communicate with multiple collectors.

Data communicated from a particular endpoint (e.g., 102a) may be transmitted over one of thousands of communications channels in a PLC system. For example, each endpoint can be assigned a particular channel using OFDM or another channel allocation technique. When endpoints 102a-102f are installed in the service network 101, the endpoints 102a-102f can each be assigned a symbol period. The symbol period that is assigned to a particular endpoint can be selected, for example, based on signal characteristics (e.g., signal amplitude) of communications signals that represent the symbols and are received at a collector, relative to the amplitude of the noise floor that is present on the channel over which the communications signals are being received. Each endpoint can be independently assigned a symbol period, such that different endpoints may transmit symbols over different symbol periods. For example, endpoint 102a may transmit each symbol over a 5 minute unit interval, while endpoint 102b may transmit each symbol over a 20 minute unit interval. Once an endpoint is assigned a symbol period, the symbol period can be stored in a memory circuit (not shown in FIG. 1) and indexed to (i.e., associated with) the endpoint and/or the channel over which the symbols from the endpoint are received.

The network management apparatus 112 and/or the collectors 104a, 104b can access the memory circuit to identify the symbol period that has been assigned to the endpoint. Using the symbol period, the collectors 104a, 104b can determine how long energy from each of the endpoints should be accumulated in order to recover the symbol being transmitted by the endpoint.

As indicated above, the embodiments may be adapted for communication of data in a number of network environments. For ease of reference, the examples herein are primarily described with reference to endpoints configured to communicate data over power lines in a PLC network, whereas in many implementations, the same circuitry and functionality thereof is also implemented as part of and/or within the collector.

Figure 2:
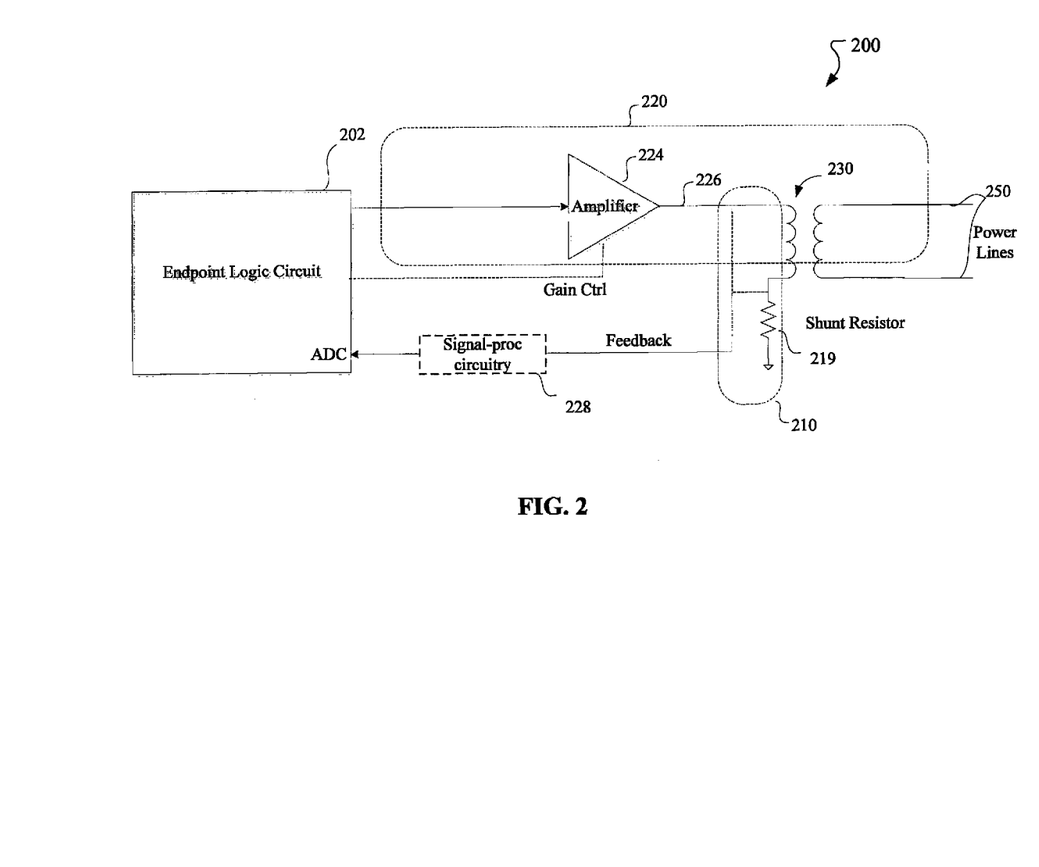
FIG. 2 shows a block diagram of a first circuit for communicating data over power lines in a PLC system.

FIG. 2 shows a general block diagram of a first circuit for communicating data over power lines. The circuit 200 includes a data-coupling circuit 220 configured to provide a data signal from an endpoint logic circuit 202 to power lines 250 (e.g., for transmission to a collector circuit). In this example, the data-coupling circuit 220 includes an amplifier 224 configured to receive and amplify a data signal output from the endpoint logic circuit 202. Transformer 230 provides the amplified data signal to the power lines 250. In this example, the output of the amplifier 224 is communicatively coupled to a primary coil of the transformer 230 and the power lines 250 are communicatively coupled to a secondary coil of the transformer 230. The transformer 230 forms a DC-isolation circuit of the data-coupling circuit 220. The DC-isolation circuit is configured to isolate DC voltages of the power lines, connected to a collector-circuit side of the data-coupling circuit 220, from the endpoint logic circuit 202, connected to an endpoint side of the data-coupling circuit 220.

A feedback circuit 210 is connected to the DC-isolation circuit (e.g., transformer 230) and is configured to provide a feedback signal indicative of an estimate of one or more characteristics of the data signal provided from the data-coupling circuit to the power lines. The feedback signal may indicate an estimate of a number of different characteristics of a signal transmission including, e.g., power, current, and/or voltage provided to the power lines by the data-coupling circuit. In this example, the feedback circuit 210 includes a power tap circuit (e.g., shunt-resistor 219) configured to generate a voltage, at a node between the resistor 219 and the primary coil, that is indicative of an amount of current passing through the primary coil of the transformer. Alternatively or additionally, a power tap circuit of the feedback circuit 210 may provide a voltage at an output 226 of the amplifier 224 as a feedback signal.

In this example, the feedback signal is provided to endpoint logic circuit 202, which is configured to adjust signal strength of the data signal based on the feedback signal. In some implementations, the logic circuit is configured to assess the feedback signal and adjust signal strength of the data signal provided to the data-coupling circuit 220. In some other implementations, the processing circuit is configured to adjust strength of the data signal provided to the power lines 250 by adjusting a gain of a variable gain circuit (e.g., amplifier 224) of the data-coupling circuit 220. Alternatively, in some other implementations, the feedback signal may be provided through a signal-processing circuit 228 (e.g., filters) to a separate control circuit and/or control circuit path (e.g., a digital-to-analog converter (DAC), wherein the adjustment is provided through the conversion from a digital signal to an analog signal). Such specific circuits (not shown in FIG. 2) are understood to provide/effect adjustment to the signal, conceptually as a gain setting/adjustment at amplifier 224 in response to the feedback signal. In yet other implementations, data-coupling circuit 220 and feedback circuit 210 may include various alternative and/or additional circuits.

Figure 3:
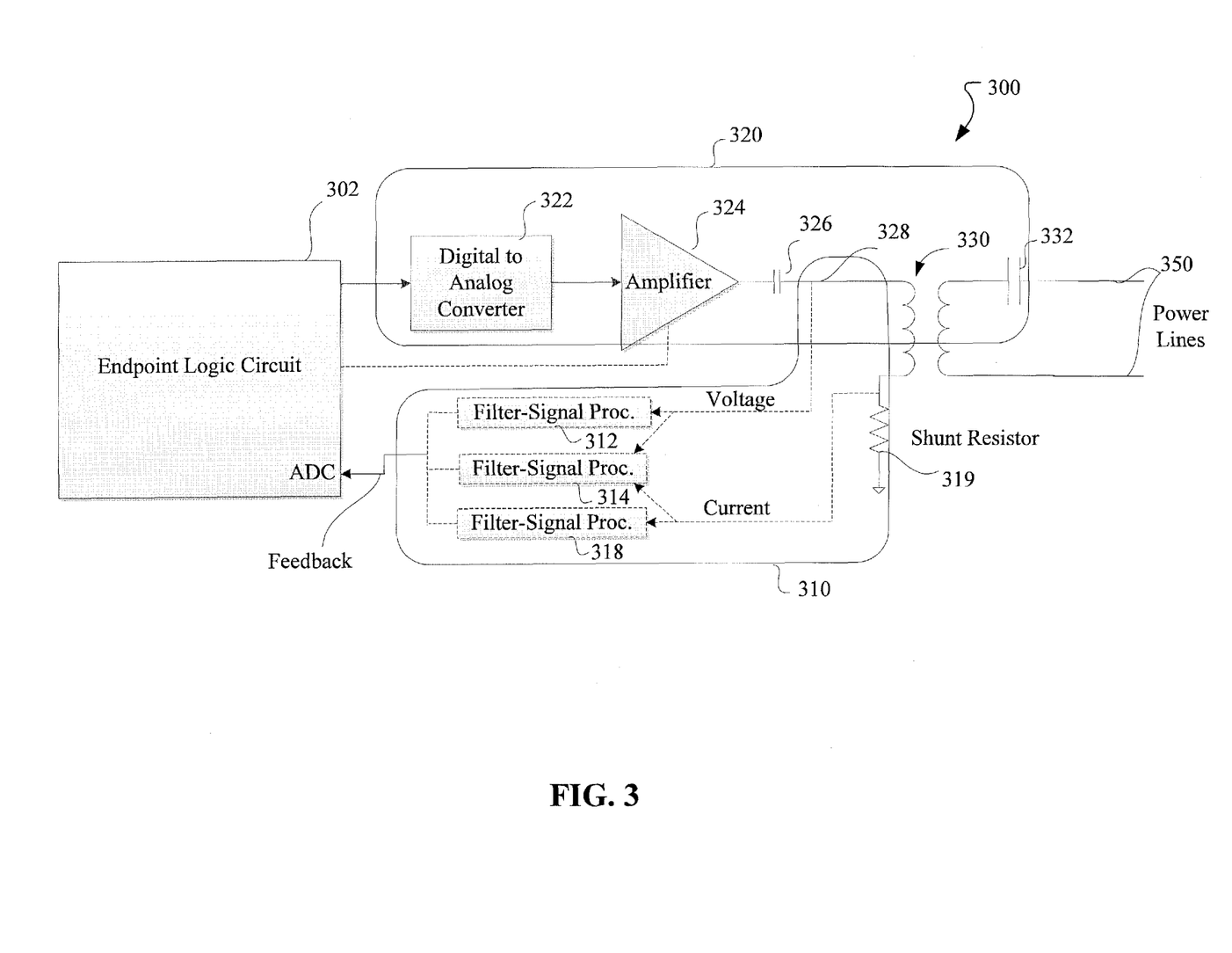
FIG. 3 shows a block diagram of a second circuit for communicating data over power lines in a PLC system.

FIG. 3 shows a block diagram of a second circuit for communicating data over power lines. Similar to the circuit shown in FIG. 2, the circuit 300 includes a data-coupling circuit 320 configured to provide a data signal from an endpoint logic circuit 302 to power lines 350 (e.g., for transmission to a collector circuit). In this example, the data-coupling circuit 320 includes a digital-to-analog converter (DAC) circuit 322 configured to convert a digital data signal to an analog data signal. An amplifier 324 is configured to receive and amplify the analog data signal for transmission. A DC-isolation circuit (e.g., capacitor 326, transformer 330, and capacitor 332) provides the amplified data signal to the power lines 350. In this example, the output of the amplifier 324 is communicatively coupled to a primary coil of the transformer 330 by capacitor 326 and the power lines are communicatively coupled to a secondary coil of the transformer 330 by capacitor 332. The DC-isolation circuit 326, 330, and 332 is configured to isolate DC voltages of the power lines 350, connected to a collector-circuit side of the data-coupling circuit 320, from the endpoint logic circuit 302, connected to an endpoint side of the data-coupling circuit 320.

A feedback circuit 310 is connected to the DC-isolation circuit (e.g., transformer 330) and is configured to provide a feedback signal indicative of an estimate of one or more characteristics of the data signal provided to the power lines. As shown in FIG. 3, the feedback circuit 310 may provide a number of signal components indicating various characteristics of a signal transmission including, e.g., power, current, and/or voltage provided to the power lines by the data-coupling circuit. In this example, the feedback circuit 310 optionally provides a feedback signal including indications of a voltage (sampled from node 328), a current (measured as a voltage across shunt resistor 319), and/or power (measured by combining the voltage and power feedback signals). Paths of the optional signal components of the feedback signal are shown as dashed lines in FIG. 3. It is recognized that various characteristics of a signal transmission (e.g., voltage, current, and/or power) may also be measured from other portions of the circuit (e.g., from a terminal of capacitor 332). The feedback circuit 310 may also optionally include various signal processing circuits (such as filters) 312, 314, and 318 for conditioning the respective signal components. For instance, the feedback signal components may be conditioned using various filter circuits including, but not limited to, low-pass filters, high-pass filters, and/or anti-aliasing filters. In certain implementations, the voltage and current signals are combined to provide a feedback signal indicative of an estimate of power, as depicted by signal processing circuit 314.

In some implementations, the endpoint logic circuit 302 may be configured to convert the feedback signal components from analog to digital values for evaluation. In some other embodiments, the feedback circuit 310 may optionally include an analog-to-digital converter (ADC) to convert the feedback signal components from analog to digital values. In some implementations, the endpoint logic circuit 302 is configured to adjust strength of the data signal provided to the data-coupling circuit 320 based on the feedback signal. In some other implementations, the logic circuit is configured to adjust signal strength of the data signal provided to the power lines 350 by adjusting a gain of a variable gain circuit (e.g., amplifier 324) of the data-coupling circuit 320. Alternatively, in some other implementations, the feedback signal may be provided to a separate control circuit (not shown) that is configured to adjust the gain of the amplifier 324 in response to the feedback signal.

Figure 4:
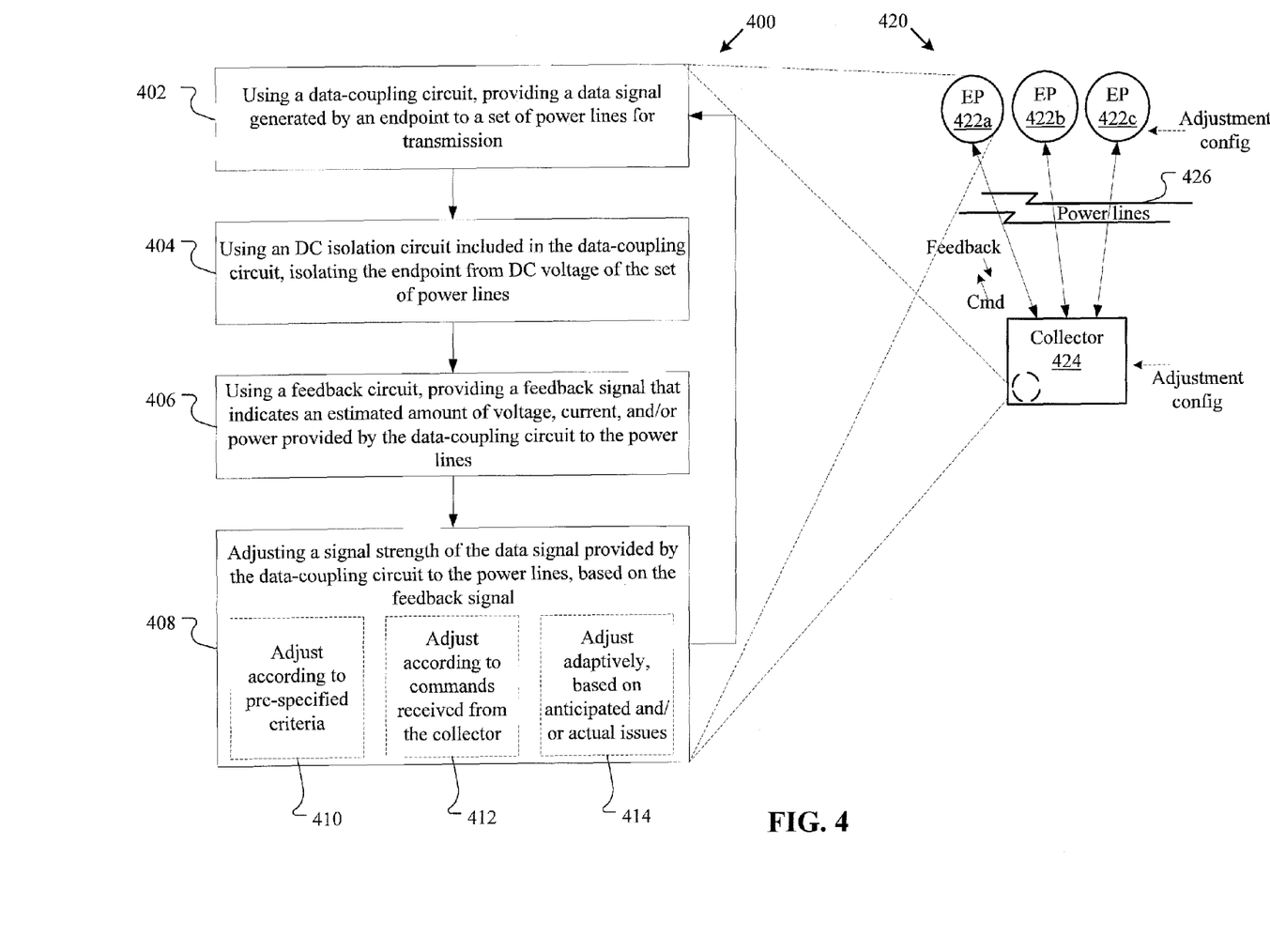
FIG. 4 shows a method for communicating data over power lines in a PLC system.

FIG. 4 shows a method for communicating data over power lines 426 between endpoints (e.g., 422a, 422b, and 422c) and a collector 424 in a PLC system 420. The method is performed for each endpoint using the processes shown in flow 400. At block 402, a data-coupling circuit is used to provide a data signal generated by an endpoint to a set of power lines for transmission. At block 404, a DC-isolation circuit included in the data-coupling circuit is used to isolate the endpoint from DC voltage of the set of power lines. A feedback signal is provided at block 406 using a feedback circuit. The feedback signal indicates an estimated amount of voltage, current, and/or power provided by the data-coupling circuit to the power lines. A signal strength of the data signal provided to the power lines from the data-coupling circuit is adjusted at block 408 based on the feedback signal. This process may be repeated, as shown in FIG. 4, during operation of the endpoint. The processes shown in blocks 402, 404, 406, and 408 may be performed either concurrently or sequentially in various embodiments.

The adjustment at block 408, may be performed using various criteria and processes specified in programming of the endpoint and/or indicated by control signals received by the endpoint (e.g., from a collector). In some implementations, the endpoint is configured to provide this adjustment automatically at block 410, based on criteria stored at the endpoint (e.g., threshold levels of the endpoint feedback signal, pre-programmed times, and/or responses to certain data requests from the collector). In some implementations, the endpoint provides this adjustment under control of a collector. For instance, the endpoint may provide the feedback to a collector. As shown in PLC system 420, the collector may receive feedback from an endpoint. The collector may analyze the feedback and transmit a command to the endpoint indicating an appropriate adjustment. The endpoint then adjusts signal strength at block 412 according to commands from the collector at block 412. In yet some other implementations, the adjustment may be performed adaptively at block 414, based on anticipated and/or actual issues. The adjustment processes shown in blocks 410, 412, and 414 may be used individually or in combination. The adjustment processes 410, 412, and 414 are provided for purposes of illustration and are not intended to exclude other processes for adjustment of signal strength.

The processes described herein can be implemented by various types of analog/digital electronic circuitry, or in computer software, firmware, or hardware, including the structures disclosed in this specification and their structural equivalents, or in combinations of one or more of them. For example, a data processing apparatus may be any of various different apparatus, devices, and machines for processing data including, by way of example, instructions executed on a processor, a computer, a system on a chip, or multiple ones, or various combinations of these. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

The processes and logic flows described in this specification can be performed by one or more programmable processors executing one or more computer programs to perform actions by operating on input data and generating output data. The processes and logic flows can also be performed by, and an apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on respective computers and having a client-server relationship to each other. In some embodiments, a server transmits data to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any disclosure or of what may be claimed, but rather as descriptions of features specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features of another figure even though the combination is not explicitly shown or explicitly described as a combination. It is intended that the specification and illustrated embodiments be considered as examples only, with a true scope of the disclosure being indicated by the following claims.

The invention claimed is:

1. A power-line-communication (PLC) apparatus for data communication over power lines in a power-line communication system between a PLC collector circuit and its power-line-coupled endpoint circuits that measure power consumption at remotely-located facilities, the apparatus comprising:
   a data-coupling circuit configured and arranged to communicatively couple data to the power lines for transmission to the PLC collector circuit, the data-coupling circuit including a DC-isolation circuit configured and arranged to isolate circuitry in the data-coupling circuit relative to the power lines; and a feedback circuit connected to the DC-isolation circuit including a power-tap circuit, on an isolated circuitry side of the DC-isolation circuit, the power-tap circuit configured and arranged to provide a feedback signal indicative of an estimate of at least one of power, current and voltage being coupled from the data-coupling circuit through the DC-isolation circuit and to the power lines.

2. The power-line-communication (PLC) apparatus of claim 1, wherein the power-tap circuit includes a shunt-resistive circuit, and wherein the DC-isolation circuit is a power transformer having a primary side and a secondary side, wherein the isolated circuitry side corresponds to the primary side.

3. The power-line-communication (PLC) apparatus of claim 2, wherein the feedback signal is provided as first and second signals respectively corresponding to current and voltage, and further including signal-processing circuitry configured and arranged to convert at least one of the first signal and the second signal from an analog signal to a digital signal, and further including an adjust circuit configured and arranged to cause a gain adjustment for a signal being communicatively coupled to the power lines by the data-coupling circuit, in response to the feedback circuit.

4. The power-line-communication (PLC) apparatus of claim 1, wherein the DC-isolation circuit includes a power transformer having a primary side and a secondary side, wherein the isolated circuitry side corresponds to the primary side, wherein the feedback signal is provided as at least one of a current signal and a voltage signal, and further including a signal-processor circuit communicatively-connected to the feedback circuit and configured and arranged to assess at least one of the current signal and the voltage signal.

5. The power-line-communication (PLC) apparatus of claim 1, further including a signal-processor circuit communicatively-connected to the feedback circuit and configured and arranged to assess from the feedback signal a current signal and a voltage signal, and wherein the signal-processor circuit is further configured and arranged to indicate, in response to an assessment thereof, whether a constant voltage, relative to a threshold, is being applied to the isolated circuitry side.

6. The power-line-communication (PLC) apparatus of claim 1, wherein the data-coupling circuit includes a variable-gain circuit, and further including a signal-processor circuit communicatively-connected to the feedback circuit and configured and arranged to assess at least one of a current signal and a voltage signal, and wherein the signal-processor circuit is further configured and arranged to cause a gain adjustment of the variable-gain circuit, in response to an assessment of at least one of the current signal and the voltage signal.

7. The power-line-communication (PLC) apparatus of claim 1, wherein the data communication over power lines between a PLC collector circuit and its power-line-coupled endpoint circuits is G3-PLC compliant.

8. The power-line-communication (PLC) apparatus of claim 1, wherein the data communication over power lines between a PLC collector circuit and its power-line-coupled endpoint circuits is G3-PLC compliant, and wherein the endpoint circuits are power-meter circuits configured and arranged to provide power-meter reports by transmitting data symbols over a power line using a respective one of a plurality of data communication channels.

9. The power-line-communication (PLC) apparatus of claim 8, wherein the data-coupling circuit includes a variable-gain circuit, and further including a signal-processor circuit communicatively-connected to the feedback circuit and configured and arranged to assess the feedback signal, and wherein the signal-processor circuit is further configured and arranged to cause the variable-gain circuit to adjust or set an amplitude of the data coupled to the power lines, in response to an assessment of the feedback signal.

10. The power-line-communication (PLC) apparatus of claim 1, wherein
the data communication over power lines between a PLC collector and its power-line-coupled endpoint circuits is G3-PLC compliant and the data communication is affected by variances in power-line impedance,
the endpoint circuits are power-meter circuits configured and arranged to provide power-meter reports by transmitting data symbols over a power line using one or more Orthogonal Frequency Division Multiplexing (OFDM) data communication channels, and
the data-coupling circuit includes a variable-gain circuit, and further including a signal-processor circuit communicatively-connected to the feedback circuit and configured and arranged to assess the feedback signal, and wherein the signal-processor circuit is further configured and arranged to cause a gain adjustment of or setting to the variable-gain circuit, in response to an assessment of the feedback signal.

11. The power-line-communication (PLC) apparatus of claim 10, wherein the data communication over power lines between a PLC collector circuit and its power-line-coupled endpoint circuits is G3-PLC compliant and the data communication is effected by signals, in the form of data symbols, transmitted over designated ones of the plurality of data channels.

12. The power-line-communication (PLC) apparatus of claim 1, further including the PLC collector circuit and a plurality of the power-line-coupled endpoint circuits.

13. A system comprising:
a power-line-communication (PLC) collector circuit;
one or more endpoint circuits configured and arranged to transmit data symbols over a plurality of data channels by data communication over power lines connected between the PLC collector circuit and said one or more endpoint circuits; and
for each of the one or more endpoint circuits, a respective signal-processing circuit communicatively connected to or forming part of said one or more endpoint circuits, the signal-processing circuit including
a data-coupling circuit configured and arranged to provide a data signal from the endpoint to the power lines for transmission to the PLC collector circuit, the data-coupling circuit including a DC-isolation circuit configured and arranged to isolate circuitry of the data-coupling circuit relative to the power lines;
a feedback circuit connected to the DC-isolation circuit including a power-tap circuit, on the isolated circuitry side thereof, configured and arranged to characterize or estimate a power parameter applied to the power lines; and
the feedback circuit including a current-feedback or voltage-feedback circuit configured and arranged to provide a feedback signal that estimates current being coupled from the data-coupling circuit to the power lines.

14. The system of claim 13, wherein the feedback signal is provided as first and second signals respectively corresponding to current and voltage, the data-coupling circuit includes a variable-gain circuit, and further including a signal-processor circuit communicatively-connected to the feedback circuit and configured and arranged to assess at least one of the first signal and the second signal, and wherein the signal-processor circuit is further configured and arranged to cause a gain adjustment of or setting to the variable-gain circuit, in response to and based on an assessment of at least one of the first signal and the second signal.

15. The system of claim 13, wherein said one or more endpoint circuits includes a residential power meter.

16. A method for power-line-communication (PLC) of data over power lines between a PLC collector circuit and its power-line-coupled endpoint circuits that measure power consumption at remotely-located facilities, the method comprising:
 providing a data-sending circuit including a DC-isolation data-coupling circuit configured to isolate circuitry of data-coupling circuitry relative to the power lines and including a feedback circuit having a current-feedback circuit or a voltage-feedback circuit configured for tapping or shunting power; and
 using the current-feedback circuit and the voltage-feedback circuit to estimate or indicate at least one of an amount of current being coupled from the data-coupling circuit through the DC-isolation data-coupling circuit and to the power lines, and an amount of voltage applied from the data-coupling circuit through the DC-isolation data-coupling circuit and to the power lines.

17. The method of claim 16, further including adjusting an amplification setting or setting a gain for coupling data to the power lines, in response to and based on an assessment of the estimation or indication.

18. The method of claim 16, wherein the power-line-communication (PLC) of data over the power lines is G3-PLC compliant and the PLC is affected by variances in power-line impedance, and further including adjusting an amplification setting in response to and based on an assessment of the estimation or indication.

19. The method of claim 16, further including conditioning a feedback signal from the feedback circuit using a low-pass filter.

20. The method of claim 16, further including conditioning a feedback signal from the feedback circuit using an anti-aliasing filter.

* * * * *